(No Model.)

J. WHITE.
COLOR CHART.

No. 488,375. Patented Dec. 20, 1892.

Witnesses:
R. J. Jacker.
Flora L. Brown.

Inventor:
James White,
By Charles Turner Brown Atty.

UNITED STATES PATENT OFFICE.

JAMES WHITE, OF CHICAGO, ILLINOIS.

COLOR-CHART.

SPECIFICATION forming part of Letters Patent No. 488,375, dated December 20, 1892.

Application filed July 11, 1892. Serial No. 439,649. (No model.)

*To all whom it may concern:*

Be it known that I, JAMES WHITE, a resident of Chicago, in the county of Cook and State of Illinois, have invented a certain new and useful Color-Chart, of which the following, when taken in connection with the drawings accompanying and forming a part hereof, is a full and complete description, sufficient to enable those skilled in the art to which it appertains to understand, make, and use the same.

My invention relates to color charts, the purpose whereof is to enable one desiring to apply a given color to a given colored background to readily learn the effect which will be caused thereby; to enable one desiring to find what effect the application of a given color upon another given color will be to readily ascertain such fact; to enable one desirous of finding the color which will have the best effect when superimposed upon a given color to easily determine the same; or to enable one who desires to place a given color adjacent to another color to ascertain what one or ones of the other colors will give the desired effect; and the object of my invention is to obtain a chart of the character named which will be readily understood by those desirous of obtaining the above named knowledge or results; to obtain a chart by which the effect of superimposing a given color either in large masses or in light lines upon a given color can be readily observed.

A further object of my invention is to obtain a chart whereby the effect of placing masses of color adjacent to each other can be observed.

I have illustrated my invention by the drawings accompanying and forming a part hereof, in which—

Figure 1:
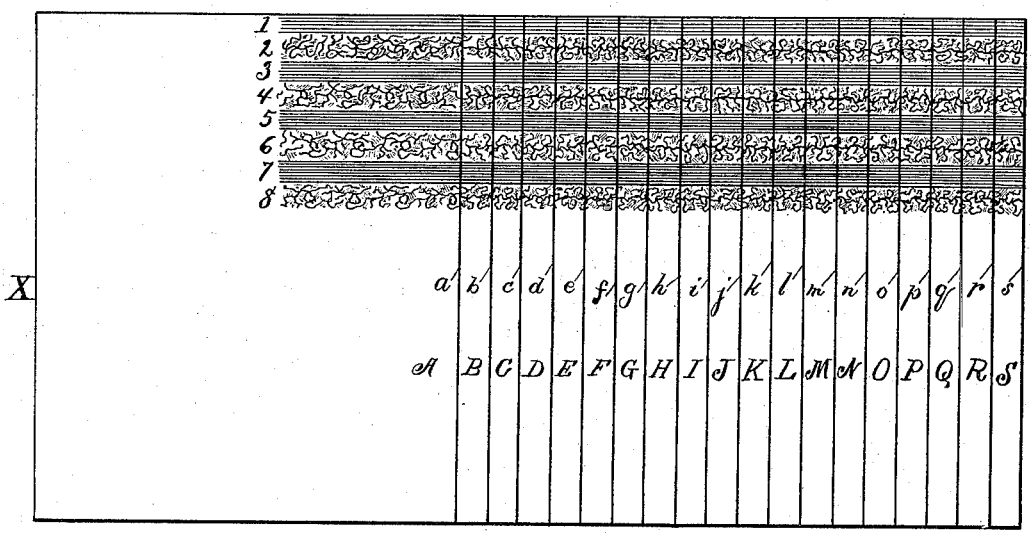
Figure 2:
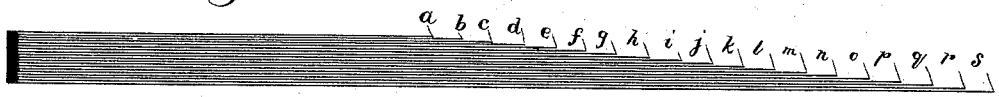
Figure 3:
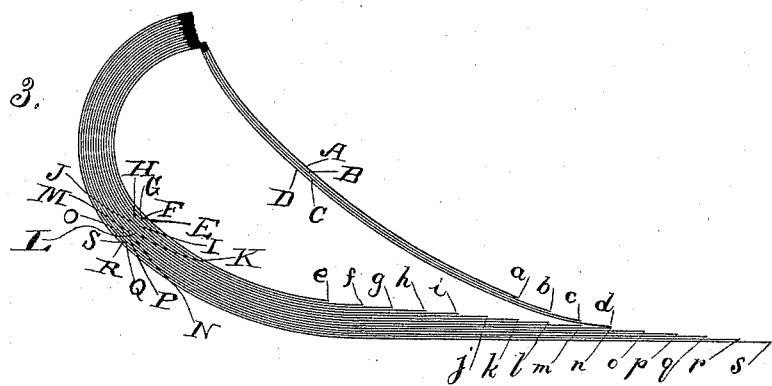

Figure 1, is a plan view of a color chart embodying my invention; Fig. 2, a side elevation of such chart; Fig. 3, represents an end elevation of the color chart embodying my device in one of the several positions in which the same can be placed in the use thereof.

The same letters and numerals of reference are used to indicate a given part where more than one view thereof is shown.

In constructing my chart, the background is formed of sheets of different length, (and preferably of colored paper) superimposed upon each other, with the shorter sheet on top arranged so that the left hand edge of every sheet is in the same plane, thereby exposing to view a portion of each sheet at the right hand end thereof. Background A is the upper of such sheets and extends from edge X to line $a$. Background A may be, and preferably, colored white. B is the next sheet of the series, and may be of the color known in the art as "azure," such sheet extending from edge X to line $b$. C is the next sheet in the series of say, primrose color extending from edge X to line $c$. D, E, F, G, H, I, J, K, L, M, N, O, P, Q, R, and S, are the remaining sheets of the series forming the background and may be, respectively, of the following colors: D, drab; E, light blue; F, cherry; G, green; H, old gold; I, green; J, terra cotta; K, Nile green; L, fawn; M, mandarin; N, canary; O, salmon; P, tea; Q, blue granite; R, blue; S, apple green. These several sheets all extend from edge X to the line lettered with the lower case letter of any given sheet, that is to say; sheet D extends from edge X to line $d$; E extends from edge X to line $e$; F extends from edge X to line $f$; G extends from edge X to line $g$; H extends from edge X to line $h$; I extends from edge X to line $x$; J extends from edge X to line $j$; K extends from edge X to line $k$; L extends from edge X to line $l$; M extends from edge X to line $m$; N extends from edge X to line $n$; O extends from edge X to line $o$; P extends from edge X to line $p$; Q extends from edge X to line $q$; R extends from edge X to line $r$.

1, 3, 5, and 7, are, respectively, masses of colors differing from each other forming parallel bars extending across the background formed by the portion of the several sheets A, B, C, &c., exposed to view when superimposed and arranged as described, and 2, 4, 6, and 8 are, respectively, bars of color, formed by lines, extending between the bars 1, 3, 5 and 7. The lines forming the several bars 2, 4, 6 and 8, may be arranged, as shown in Fig. 1, to form ornamentation, but are not necessarily so arranged. Bars 1 and 2 are of the same color, say red; bars 3 and 4 are of the same color, say green; bars 5 and 6 are of the same color, say brown; and bars 7 and 8 are of the same color, say blue.

The bars 1 to 8, both inclusive, are preferably formed by me with printers' ink; and enough of such bars are printed on the background to illustrate the effect of as many different colored inks as desired; while the sheets of paper forming the background should include all the different shades of color made in any given quality or kind of paper a practical manner of using my color chart is immediately suggested, on mere inspection thereof, to one skilled in the art, as say, to a printer. For instance, if the effect of a mass of green ink on paper of a terra cotta color is desired to be known, it can at once be observed by inspection of bar 3 on the bar formed by the portion of sheet J (between lines $i$ and $j$) exposed to view in the chart when in the position illustrated in Fig. 1, and if the effect produced by a series of lines of the same color, (green) on a sheet of terra cotta colored paper is to be obtained an inspection of a bar 4 on sheet J will illustrate such effect. Where the effect of having a mass of old gold color adjacent to a mass of blue granite color is desired to be known, the chart can be brought into the position illustrated in Fig. 3 with line $h$ superimposed on line $p$ when such colors will be brought into the proper position for inspection, upon the portion of such sheets below the bars 2, 2, 3, 4, 5, 6, 7, and 8. Of course where observation is desired of any adjacent colors in the chart as the same is constructed it can be obtained by mere inspection thereof.

If the inspection of the effect of placing any given colored ink on any given colored paper is to be observed unaffected by the effect of the same colored ink on the bars of different colored paper lying adjacent thereto, (such bars being formed by the exposed portions of the several sheets forming the background of chart), the leaves of the chart formed by the sheets above the sheet to be observed are opened away from such sheet, in the ordinary way of opening the leaves of a book; and the sheet to be observed can then be raised from the sheet below it and separately viewed.

Having thus described my invention, what I claim as new, and desire to secure by Letters Patent is—

1. A color chart composed of sheets of different colored material of different length; one edge of all the sheets being in the same plane, whereby a background of different colored bars is formed, in combination with different colored bars composed of masses of color extending transversely across the bars of the background; substantially as described.

2. A color chart composed of sheets of different colored material of different length; one edge of all the sheets being in the same plane, whereby a background of different colored bars is formed, in combination with different colored bars composed of lines of color extending transversely across the bars of the background; substantially as described.

3. A color chart composed of sheets of different colored material of different length; one edge of all the sheets being in the same plane, whereby a background of different colored bars is formed, in combination with different colored bars composed of masses of color extending transversely across the bars of the background; with intermediate bars composed of lines of color also extending laterally across such background; substantially as described.

JAMES WHITE.

Witnesses:
FLORA L. BROWN,
KATIE A. HARGADEN.